United States Patent

[11] 3,555,309

[72] Inventor Allen LeRoy Limberg
Somerville, N.J.
[21] Appl. No. 680,483
[22] Filed Nov. 3, 1967
[73] Assignee RCA Corporation
a corporation of Delaware

[54] ELECTRICAL CIRCUITS
8 Claims, 4 Drawing Figs.

[52] U.S. Cl. .......... 307/297, 330/98
[51] Int. Cl. .......... H03k 1/12
[50] Field of Search .......... 307/297, 310; 330/98

[56] References Cited
UNITED STATES PATENTS

| | | | |
|---|---|---|---|
| 3,069,617 | 12/1962 | Mohler | 307/297 |
| 3,105,187 | 9/1963 | Schauwecker | 307/297 |
| 3,201,606 | 8/1965 | Mamon | 307/297 |
| 3,257,621 | 6/1966 | Jadoul | 307/297 |
| 3,300,658 | 1/1967 | Slusher | 307/297 |
| 3,317,818 | 5/1967 | Beyer | 307/297 |

*Primary Examiner*—Donald D. Forrer
*Assistant Examiner*—David M. Carter
*Attorney*—Eugene M. Whiteacre

ABSTRACT: An electrical circuit especially suited for fabrication using integrated circuit techniques including a common emitter transistor amplifier connected in cascade relation with a common collector transistor amplifier and interconnected with a pair of resistors of predetermined resistance ratio in a degenerative feedback loop so that the common emitter stage additionally provides a stabilized direct current voltage reference for the common collector stage.

INVENTOR
ALLEN L. LIMBERG
BY Charles Brodsky
ATTORNEY

ELECTRICAL CIRCUITS

This invention relates to electrical circuits and, more particularly, to an integrated circuit including a common emitter transistor amplifier connected in cascade relation with a common collector transistor amplifier and interconnected with a pair of resistors of predetermined resistance ratio in a degenerative feedback loop so that the common emitter stage additionally provides a stabilized direct current DC voltage reference for the common collector stage. Depending upon the manner of its connection to surrounding and cooperating electrical circuitry, the integrated arrangement can perform many different functions. Some of these, to be described below, are: as a source of regulated operating potential; as a translating stage for referencing an output signal to a direct voltage different from that to which the corresponding input signal is referenced; and as an amplifier stage in which the signal gain and DC output voltage can be individually controlled. As used herein, the term "integrated circuit" refers to a unitary or monolithic semiconductor device or chip which is the equivalent of a network of interconnected active and passive circuit elements.

In accordance with the invention, the pair of resistors are serially coupled between the emitter electrode of the common collector transistor and a point of reference potential, such as ground. The junction between the resistors is coupled to the base electrode of the common emitter transistor, with the degenerative feedback loop being completed by coupling the collector electrode of the latter transistor to the base electrode of the former transistor. A direct connection is further made between the collector electrode of the first mentioned transistor and a point of operating potential, while a similar such direct connection is made between the emitter electrode of the second mentioned transistor and the reference, or ground potential point.

In the case of a source of regulated operating potential, the couplings to the respective base electrodes of the two transistors may be made by way of direct connections. A third resistor is additionally included to couple the junction between the collector electrode of the common emitter transistor and the base electrode of the common collector transistor to the operating potential point. With this arrangement, a DC voltage equal to one $V_{be}$ volts will be developed across the base-emitter junction of the common emitter transistor and, also, across the one of the pair of resistors which is closer to the reference ground potential point. A DC voltage equal to $NV_{be}$ volts will further be developed across the other of the pair of resistors so that a potential equal to $(N+1)V_e$ volts will exist at the emitter electrode of the common collector transistor, measured with respect to ground. N, in this instance, represents $R_1/R_2$, the ratio between the serially coupled pair of resistors, with the value of the resistor closer to the emitter electrode of the common collector transistor being in the numerator and that of the farther resistor being in the denominator. It will be understood that, as used herein, the term $V_{be}$ volts represents the average base-to-emitter voltage of a transistor which is operating as the active device in an amplifier circuit or the like. For silicon transistors, this $V_{be}$ voltage is approximately 0.7 volts.

In one case of a translating stage for referencing an output signal to a direct voltage different from that to which the corresponding input signal is referenced, the coupling to the base electrode of the common collector transistor is by way of a direct connection while that to the corresponding electrode of the common emitter transistor is via a third serially connected resistor. A fourth resistor is further included, this time to couple the junction between the collector electrode of the common emitter transistor and the base electrode of the common collector transistor to the emitter electrode of an added third transistor. The collector electrode of that third transistor is directly connected to the operating potential point, while its base electrode is connected so as to receive the applied input signals. With this configuration, and with a bypass capacitor connected between ground and one of the points in the feedback loop, at the base electrode of the common emitter transistor for example, an output signal will be developed at the emitter electrode of the common collector transistor referenced to a direct voltage substantially equal to $(N+1)V_{be}$, where N and $V_{be}$ are as previously defined.

In the case of an amplifier stage, the arrangement is substantially identical to that of the operating potential source, but with the addition of an input signal supply being capacitively coupled to the base electrode of the common emitter transistor. An output signal will be developed at the emitter electrode of the common collector transistor, amplified by an amount primarily determined by the product of the transconductance, or $g_m$, of the common emitter transistor and the resistance value of the third resistor $R_L$. This output signal will additionally be referenced to the previously defined $(N+1)V_{be}$ direct voltage potential. An amplified signal will also be developed at the junction between the collector electrode of the common emitter transistor and the base electrode of the common collector transistor, but will there be referenced to an $(N+2)V_{be}$ voltage, the added $V_{be}$ voltage reference being due to the drop across the base-emitter junction of the common collector transistor. Various utilization circuits can be adapted to operate with these signals, one such circuit, for example, being a differential amplifier having a first input terminal connected to receive the amplified signals and a second input terminal connected to a point of $(N+1)V_{be}$ or $(N+2)V_{be}$ voltage as the case may be. Since the gain provided by the amplifier stage will be dependent upon the product of the $g_m$ of the common emitter transistor and the resistance value of $R_L$, and the direct voltage output upon the ratio between $R_1$ and $R_2$, it will be apparent that either can be controlled independently of the other.

As will become clear hereinafter, the foregoing circuit arrangements are particularly attractive for integrated circuit design. The operation of each, for example, depends on the ratio of the serially coupled pair of resistors, which, in an integrated circuit structure, is relatively stable, although the absolute values of the resistors may vary because of the manufacturing process tolerances. In the regulated potential supply environment, the fact that the $V_{be}$ voltages provided may vary somewhat with temperature does not prove undesirable where the supply is used to bias amplifier stages employing integrated circuit transistors whose base-to-emitter voltage drops vary with temperature in the same manner and direction. In the direct voltage rereferencing situation, where the bypass capacitor would normally be connected external to the integrated chip, it will be appreciated that one less terminal will be used to connect to that capacitor than would usually be the case where conventional capacitive coupling is used between stages to perform the rereferencing function, a point of major importance where the number of available terminals on the chip are limited. In the amplifier arrangement, further more, both the signal gain provided and the quiescent direct voltage output level can be independently set so as to permit optimum performance of any subsequently connected amplifier circuitry, or the like. With respect to these features, it will be understood that capacitors, in integrated circuit design, occupy considerable area on the monolithic device, even for a relatively small amount of capacitance.

The terms "resistors", "capacitors", "transistors", "rectifiers", etc. as used herein are intended to apply to the equivalent device as incorporated in or on an integrated circuit device, unless otherwise indicated. The manner of implementing these components on such a device is known in the art.

The novel features which are considered characteristic of this invention are set forth with particularity in the appended claims. The invention itself, however, both to its organization and method of operation as well as additional objects and advantages thereof will best be understood from the following description when read in accordance with the accompanying drawings in which:

Figure 1:
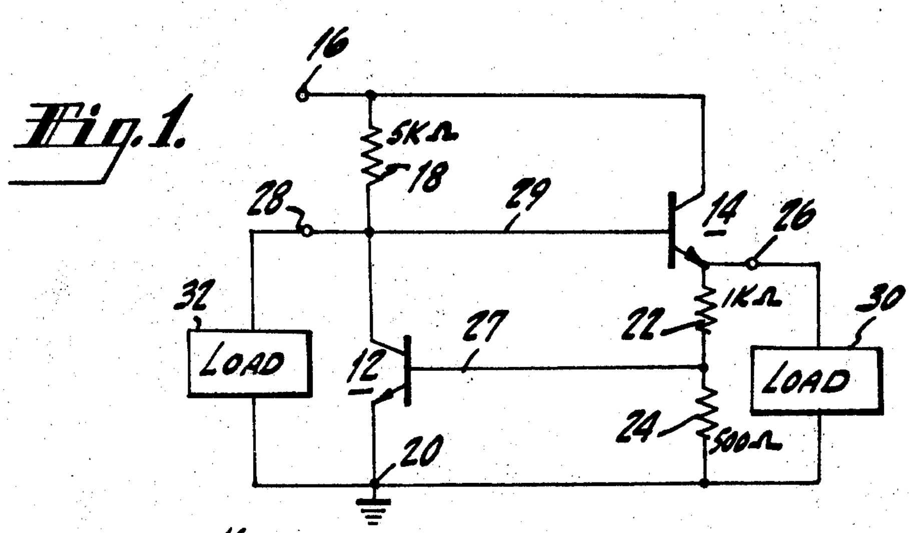
FIG. 1 is a schematic circuit diagram of a source of regulated operating potential according to the invention.

Referring now to the drawings, wherein like reference characters are used to designate like elements throughout the several FIGS. and particularly to FIG. 1, the regulated operating supply there shown includes a pair of transistors 12 and 14. One transistor 12 is arranged in a common emitter type configuration, with its collector electrode connected to an energizing potential terminal 16 through a resistor 18 and with its emitter electrode connected to a reference terminal 20, which is shown at ground potential. The other transistor 14 is arranged in a common collector type configuration, with its collector electrode connected to the energizing potential terminal 16 and with its emitter electrode connected to the reference terminal 20 through a pair of serially coupled resistors 22 and 24. The emitter electrode of transistor 14 is connected to a first output terminal 26 while the junction between the resistors 22 and 24 is connected to the base electrode of transistor 12 by a lead 27. The collector electrode of transistor 12 is additionally connected to the base electrode of transistor 14 by a lead 29 and to a second output terminal 28. Appropriate load circuits 30 and 32 are connected between the first and second output terminals 26 and 28 and reference terminal 20, respectively. Potential terminal 16 and reference terminal 20 are adapted to be connected to a source of energizing potential of proper polarity (not shown).

In the operation of the regulated supply of FIG. 1, i.e., with a proper polarity potential source connected between the terminals 16 and 20, a point of equilibrium is reached at which one $V_{be}$ voltage drops are developed across the base-emitter junctions of each of the transistors 12 and 14. The series combination of the base-emitter junction of transistor 14 and the resistor 22, however, is connected in parallel with the collector-base junction of transistor 12 by leads 27 and 29. The quiescent voltage developed between the collector and emitter electrodes of transistor 12, therefore, equals the sum of the $V_{be}$ voltage drops of transistors 12 and 14 and the voltage drop across resistor 22. With the emitter electrode of transistor 12 grounded via terminal 20, a potential equal to the $V_{be}$ voltage drop of transistor 12 is developed at the common junction of resistors 22 and 24 relative to the ground terminal 20, while a potential equal to that $V_{be}$ voltage plus the voltage drop across the resistor 22 is developed at output terminal 26 relative to ground. With a resistance value for resistor 24 which is small relative to the input impedance of the transistor 12, as can be seen from the drawing, this latter voltage drop substantially equals $NV_{be}$, where N represents the resistance ratio between resistors 22 and 24, with the resistance value of the resistor 22 being in the numerator and that of the resistor 24 being in the denominator. The potential developed at the output terminal 26 with respect to ground thus is seen to be $(N+1)V_{be}$. Where transistors 12 and 14 are each composed of the same semiconductor material, such as in a monolithic silicon integrated structure, the potential developed at the output terminal 28 would be $(N+2)V_{be}$ relative to the terminal 20. With the illustrative values shown in the drawing, $3V_{be}$ and $4V_{be}$ voltages will be developed at the output terminals 26 and 28, respectively. If the terminal 20 were not grounded but were at some level of direct voltage instead, then these output potentials would each be increased by that amount.

The regulated supply of FIG. 1, is a stabilized circuit in that the degenerative feedback loop bounded by the collector-base junction of transistor 12, the lead 29, the base-emitter junction of transistor 14, the resistor 22, and the lead 27, balances out any voltage variations in the supply due to changes in the operating potential applied between terminals 16 and 20. A second feature of the supply of FIG. 1 is that no capacitors are employed and, thus, the problems that would be created by incorporating capacitors in integrated circuit design are eliminated. A third feature is that low values of resistance (of the order of 5,000 ohms or less) can be used for resistors 18, 22 and 24 and, therefore, only a small amount of space on the integrated chip is required. A fourth feature of the supply is that the circuit presents low output impedances at the terminals 26 and 28, in the order of 100 ohms and less. A fifth feature is that the output potentials developed are referenced against ground and are thus substantially free of any random variations produced at the potential terminal 16 by common impedance coupling to that terminal from the various other circuits on the integrated chip.

Figure 4:
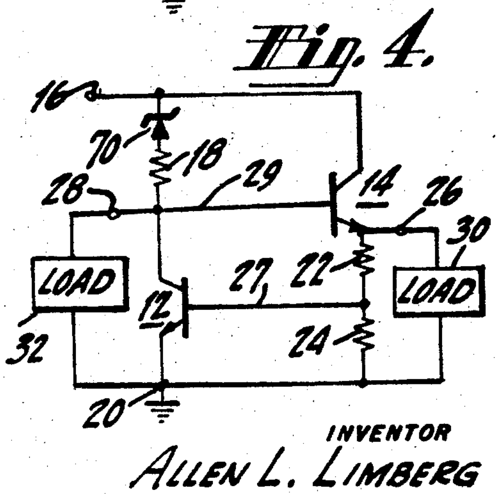
FIG. 4 is a schematic circuit diagram of a modification of the operating potential source of FIG. 1.

Enhanced freedom from oscillation can be had in the circuit of FIG. 1, if desired, by a number of methods. In one, a resistor, not shown, can be substituted for the direct connection 27 to form a dominant time constant with the Miller capacitance of the transistor 12. In another, one or more forward biased and/or avalanche diodes can be connected in series with the load resistor 18, to reduce the transconductance $g_m$ of the transistor 12 and, consequently, the gain around the feedback loop. A circuit arrangement using a zener diode 70 to effect this reduction in $g_m$ and increases in DC stability is shown in FIG. 4.

Figure 2:
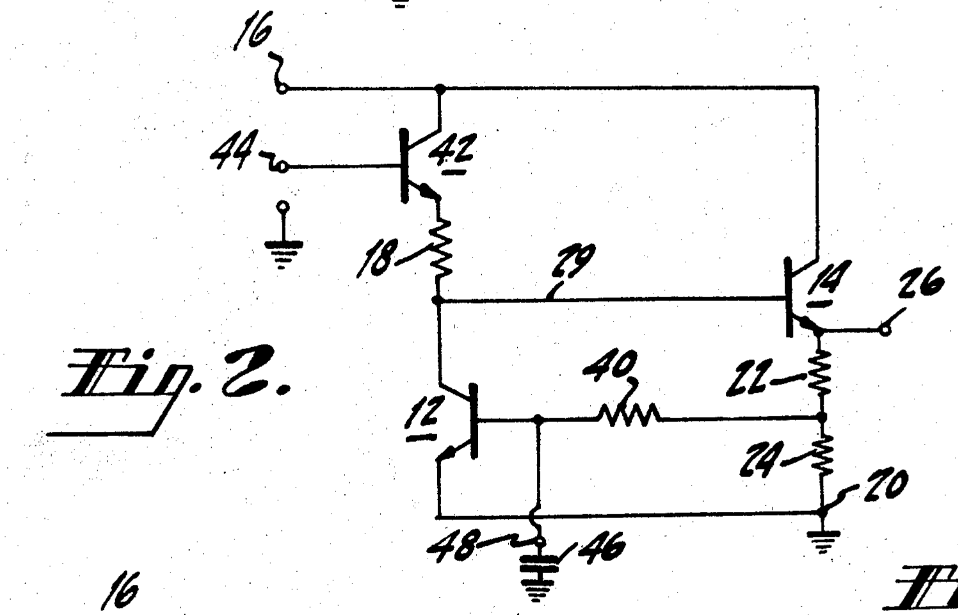
FIG. 2 is a schematic circuit diagram embodying the present invention of a translating stage for referencing an output signal to a direct voltage different from that to which the corresponding input signal is referenced.

The direct current rereferencing stage shown in FIG. 2 is of the same general form as the regulated supply of FIG. 1. The rereferencing stage differs, however, in that the junction of the resistors 22 and 24 is connected to the base electrode of the transistor 12 by means of a serially coupled resistor 40 instead of the lead 27 of FIG. 1. The stage also differs in that the end of resistor 18 remote from the transistor 12 is connected to the emitter electrode of an added third transistor 42 rather than to the potential terminal 16. The collector electrode of the transistor 42 is instead connected to the terminal 16 and its base electrode is connected to a source of input signals, represented in the drawing by the terminal 44. The direct current rereferencing stage further differs from the arrangement of FIG. 1 by including a bypass capacitor 46 in the feedback loop, for example, to couple the base electrode of transistor 12 to ground. In an integrated version of the circuit shown in FIG. 2, it will be understood that, depending upon the available area on the chip, the capacitor 46 may be connected as an external component. In such cases, the capacitor 46 would be connected to the circuit on the chip through a terminal 48, in the manner shown in FIG. 2.

In the operation of the stage, input signals which are referenced to a first DC voltage level are supplied via terminal 44 to the base electrode of the transistor 42. These signals may be referenced, for example, to a fraction of the operating potential applied to the terminal 16, and are subsequently translated by the base-emitter junction of the transistor 42 and the resistor 18 to the base electrode of the transistor 14. The DC component of the signals developed at the output emitter electrode of the transistor 14 would normally be at a voltage level one $V_{be}$ volts below that existing at its input base electrode, but because of the negative feedback action provided by the loop bounded by the lead 29, the base-emitter junction of transistor 14 the base-collector junction of transistor 12, and the resistors 22 and 40, that level is constrained to one which is substantially equal to $(N+1)V_{be}$, N and $V_{be}$ being as set forth above. Any tendency for the input DC level to vary (due to a variation in the value of the operating potential supply, for example) is offset, furthermore, by the feedback within the loop so that the output DC component becomes stabilized against such changes.

The alternating current AC component of the signals developed at the emitter electrode of the transistor 14, on the other hand, is bypassed to ground by the capacitor 46 and, therefore, is not degenerated by the feedback loop. That component thus produces an output signal by emitter follower action at the terminal 26. The resulting rereferencing of the DC component of the input signal in this manner, without substantially affecting the AC component, is particularly desirable where terminal 26 is connected to additionally bias a succeeding stage designed to operate with multiple $V_{be}$ bias voltages instead of with the input fractional operating potential voltage.

It will be noted that as a result of the above described action, the direct current voltage at the emitter electrode of the transistor 14 will be independent of variations in the potential applied to terminal 16. That is, being dependent primarily on $V_{be}$ voltage drops, this voltage varies not a function of operating potential, but as a function of temperature. This, however, may not be a problem in integrated circuit design but an advantage, for example, in those cases where the direct current voltage sets the base-emitter bias for a succeeding transistor amplifier stage connected to the terminal 26. In such cases, the variations in the DC voltage is in a direction to offset similar variations with temperature in the base-to-emitter voltage drop of the following transistor and helps to maintain more constant current flow therein. It will also be noted that the inclusion of the resistors and transistors in a direct current rereferencing stage such as shown in FIG. 2 is oftentimes justified in integrated circuit design, even if only to save one of the two terminals which would be used in employing a more conventional coupling capacitor for rereferencing purposes, in those instances where the number of available terminals on the chip are severely limited. (It will be understood in this regard that the ground terminal 20 is required in any case and is not counted toward the number of terminals used in the rereferencing scheme.) It will be appreciated, however, that with present integrated circuit fabrication techniques, the amount of space required on the monolithic chip to include these added components is acceptably small. As with the arrangement of FIG. 1, a direct connection can be used to couple to the base electrode of the transistor 12 in FIG. 2 instead of the resistor 40, without impairing the operation of the rereferencing stage.

Figure 3:
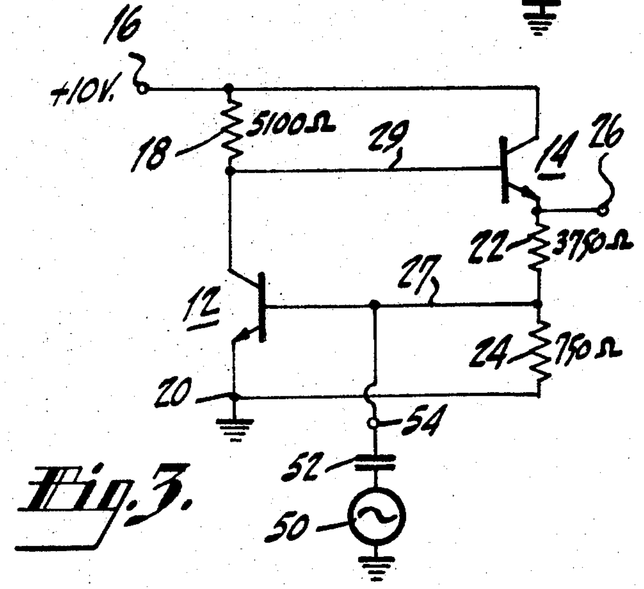
FIG. 3 is a schematic circuit diagram of an amplifier stage in which the signal gain and direct current output voltage can be individually controlled, and which is constructed in accordance with the invention.

The amplifier stage shown in FIG. 3 is substantially identical in construction to the regulated operating supply of FIG. 1 and, as in that supply, choice of the resistance ratio between the resistors 22 and 24 primarily determines the direct voltage output level to which, in this case, the amplified signals will be referenced. The amplifier, in addition to the components recited with respect to FIG. 1, includes a source of AC input signals 50, which is coupled to the base electrode of the transistor 12 by means of a capacitor 52. It will be understood that in an integrated circuit version of the amplifier of FIG. 3, both the source 50 and the capacitor 52 will be external to the monolithic chip, but will be connected to the remainder of the amplifier circuitry thereon via a terminal 54. The source 50 and the capacitor 52 are selected to exhibit an impedance at the input signal frequency which is considerably smaller than the resistance value of the parallel combination of the resistors 22 and 24.

With such an arrangement, choice of the resistance values for the resistors 22 and 24, once again determines the DC output voltage established at the output terminal 26. More particularly, by virtue of the degenerative action within the feedback loop between the collector and base electrode of the transistor 12, the DC voltage is established at terminal 26 at the aforedefined $(N+1)V_{be}$ level. The feedback loop is effectively bypassed for AC signals, however, in that substantially all of the AC signal voltage is dropped across the resistor 22. This follows since the impedance of the resistor 22 is many times greater than the effective impedance apparent at the base electrode of the common emitter transistor 12. The signal gain provided by the amplifier stage is thus set by the product of the transconductance, or $g_m$, of the transistor 12 and the value of its load resistor 18, which, as can be seen, is independent of the DC output voltage established by selection of the resistors 22 and 24. With the values shown in the drawing, a voltage gain of approximately 150 times is provided, and the signals developed at the output terminal 26 are each referenced to a $6V_{be}$ volts level. Alternatively, the amplified signals can be taken from the output terminal 28, where they are referenced to a $7V_{be}$ level. It will be apparent that, in such a case, the added $1V_{be}$ volts of reference follows from the 0.7 volts drop across the base-emitter junction of the transistor 14.

As was previously mentioned, these amplified signals can be coupled to an input terminal of a differential amplifier type utilization circuit (not shown), for example, which also is referenced to a corresponding $6V_{be}$ or $7V_{be}$ level, as the case may be. With a one volt or so input signal, such a circuit can then be used to provide limiting, if desired.

I claim:

1. An electrical circuit comprising:

first and second transistors, each having an emitter electrode, a base electrode, and a collector electrode;

circuit means coupled to the emitter, base, and collector electrodes of said first transistor for connecting said first transistor in a common emitter configuration, with the emitter electrode of said first transistor being directly connected to a point of reference potential;

circuit means coupled to the emitter, base, and collector electrodes of said second transistor for connecting said second transistor in a common collector configuration, said last-mentioned circuit means including a pair of impedance elements of predetermined ratio N serially direct current coupled between the emitter electrode of said second transistor and said point of reference potential;

means for direct current coupling the collector electrode of said first transistor to the base electrode of said second transistor;

means direct current coupling the junction between said serially coupled impedance elements to the base electrode of said first transistor to provide a degenerative feedback circuit including at least said first transistor, the base and emitter of said second transistor and said impedance elements for producing first and second direct voltages at the emitter and base electrodes, respectively, of said second transistor which, with respect to said reference potential, are substantially equal respectively to $(N + 1)$ times and $(N + 2)$ times the base electrode to emitter electrode voltage drop of said first transistor; and utilization means coupled between one of the emitter and base electrodes of said second transistor and said point of reference potential.

2. An electrical circuit as defined in claim 1 wherein N is defined as the ratio between the value of the one of said impedance elements nearer the emitter electrode of said second transistor to the value of the one of said impedance elements nearer to said point of reference potential.

3. An electrical circuit as defined in claim 1 wherein said impedance elements comprise a pair of serially connected resistors and wherein said predetermined ratio N comprises the ratio between the resistance value of the one of said resistors nearer the emitter electrode of said second transistor to the resistance value of the one of said resistors nearer said point of reference potential.

4. An electrical circuit as defined in claim 3 wherein said first and second transistors, said common emitter connecting means, said common collector connecting means including said pair of resistors, said coupling means to the base electrode of said first transistor, and said coupling means to the base electrode of said second transistor are all disposed on a single integrated circuit.

5. An electrical circuit comprising:

first and second transistors, each having an emitter electrode, a base electrode, and a collector electrode;

first the second terminals adapted to be connected to a source of energizing potential;

first means coupling the collector electrode of said first transistor to said first terminal;

a direct current connection from the emitter electrode of said first transistor of said second terminal;

a direct current connection from the collector electrode of said second transistor to said first terminal;

second means including first and second series connected resistors direct current coupling the emitter electrode of said second transistor to said second terminal, with said first resistor being nearer to said emitter electrode and with said second resistor being nearer to said second terminal, the ratio of resistances of said first and second resistors being substantially equal to N;

third means direct current coupling the collector electrode of said first transistor to the base electrode of said second transistor; and fourth means direct current coupling the junction between said first and second resistors to the base electrode of said first transistor to provide a degenerative feedback circuit including at least said first transistor, the base and emitter of said second transistor and said series-connected resistors for producing a direct voltage between the emitter electrode of said second transistor and said second terminal which is of a value substantially equal to (N + 1) times the forward base emitter conductive voltage drop of said first transistor.

6. An electrical circuit as defined in claim 5 wherein said first means comprises a third resistor and said third and fourth means each comprise direct current connections for establishing direct voltages between the emitter and base electrodes of said second transistor and said second terminal at values substantially equal to (N+1) and (N+2—) times the base electrode-to-emitter electrode voltage drop of said first transistor, respectively.

7. An electrical circuit as defined in claim 5 wherein said first means comprises a third resistor serially connected to said first terminal through the current path existing between the collector and emitter electrodes of an additionally included third transistor, the collector electrode of which is direct current connected to said first terminal and the base electrode of which is adapted to receive applied input signals referenced to a first direct voltage, wherein said third and fourth means comprise a direct current connection and a further fourth resistor, respectively, and wherein there is additionally included a signal bypass capacitor connected between an end of said fourth resistor and said second terminal to provide corresponding output signals at the emitter electrode of said second transistor which are referenced to a second direct voltage of a value substantially equal to (N+1) times the base electrode-to-emitter electrode voltage drop of said first transistor.

8. An electrical circuit as defined in claim 5 wherein said first means comprises a third resistor and said third and fourth means each comprise direct current connections, and wherein there is additionally included a source of input signals and a coupling capacitor serially connected in the order named between said second terminal and the base electrode of said first transistor, with the impedance exhibited by said additional series connection at signal frequencies being substantially less than the resistance value of the parallel combination of said first and second resistors, for providing amplified signals at the emitter electrode of said second transistor referenced to a direct voltage substantially equal to (N+1) times the base electrode-to-emitter electrode voltage drop of said first transistor.

Disclaimer 3,555,309.—*Allen LeRoy Limberg,* Somerville, N.J. ELECTRICAL CIRCUITS. Patent dated Jan. 12, 1971. Disclaimer filed June 10, 1983, by the assignee, *RCA Corp.*

Hereby enters this disclaimer to claims 5 and 6 of said patent.

[*Official Gazette December 25, 1984.*]